United States Patent [19]

Millsapps

[11] 4,055,225
[45] Oct. 25, 1977

[54] LUBRICANT PRESSURE COMPENSATOR FOR AN EARTH BORING DRILL BIT

[75] Inventor: Stuart C. Millsapps, Houston, Tex.

[73] Assignee: Hughes Tool Company, Houston, Tex.

[21] Appl. No.: 687,131

[22] Filed: May 17, 1976

[51] Int. Cl.² .............................................. E21B 9/10
[52] U.S. Cl. .................................... 175/228; 175/372
[58] Field of Search .............. 175/228, 227, 229, 371, 175/372, 339

[56] References Cited

U.S. PATENT DOCUMENTS 3,719,241  3/1973  Bell ..................................... 175/228
3,721,306  3/1973  Sartor .................................. 175/228

Primary Examiner—Ernest R. Purser
Assistant Examiner—William F. Pate, III
Attorney, Agent, or Firm—Robert A. Felsman

[57] ABSTRACT

An improved lubricant pressure compensator system for an earth boring drill bit for equalizing the lubricant pressure with the ambient or borehole pressure. The pressure compensator is located in a lubricant reservoir that has a passage leading out of the bit adjacent the discharge nozzle. A flexible diaphram is located in the reservoir with its lip seated against the base of the reservoir. The lip protrudes outwardly and a protector member bears downwardly against the lip. A cap bears against the protector member compressing the lip. A retainer ring holds the cap with the lip under compression. A protective centering disc is attached to the center of the diaphram.

10 Claims, 5 Drawing Figures

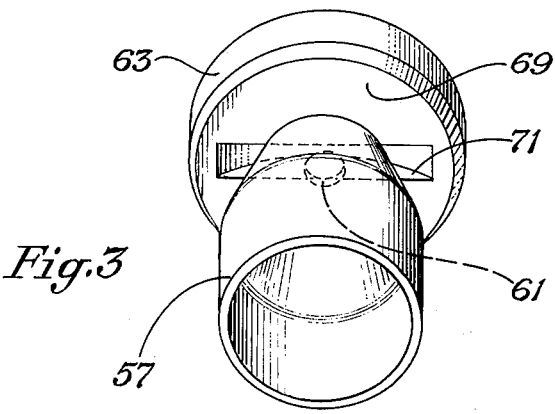
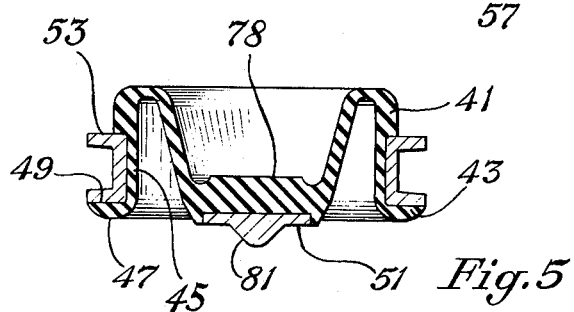
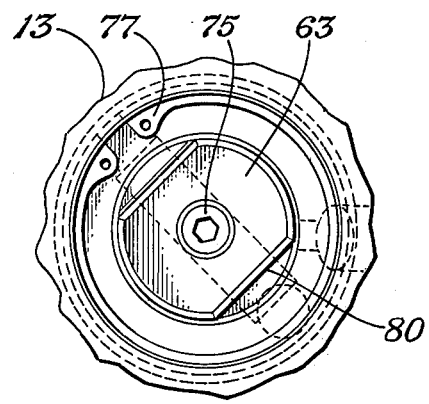
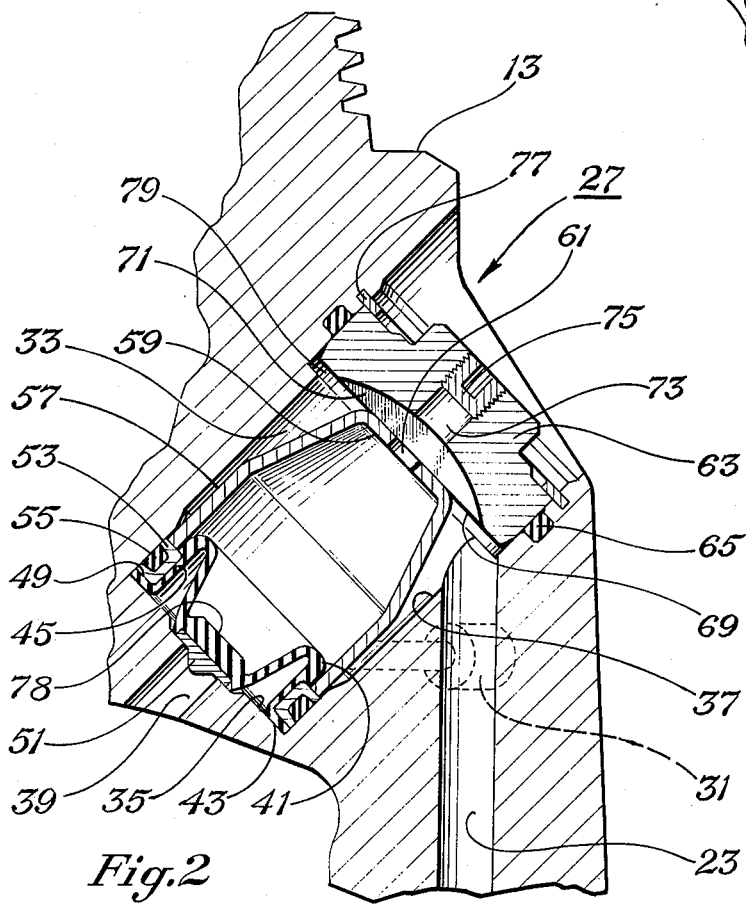

LUBRICANT PRESSURE COMPENSATOR FOR AN EARTH BORING DRILL BIT

BACKGROUND OF THE INVENTION

1. Field of the Invention

This invention relates in general to improvements in the lubricant systems in earth boring drill bits and in particular to an improved pressure compensator for equalizing lubricant pressure with borehole fluid.

2. Description of the Prior Art

Earth penetrating tools, including the rotatable cutter-type earth boring drill bit, commonly use varying lubrication systems. These lubrication systems include a seal and normally have a pressure compensator to limit the pressure differential across the seal. Various compensators are shown in U.S. Pat. No. 3,476,195 issued to Galle and U.S. Pat. No. 3,721,306 issued to Sartor.

Generally the pressure compensator is located in a recess or reservoir that is in communication with the lubricant passages and spaces. A flexible diaphragm is sealed in the reservoir, with one side in communication with the borehole fluids and the other side in communication with the lubricant. The diaphragm expands and contracts as the borehole fluid pressure varies, equalizing the lubricant pressure with the borehole fluid pressure. Frequently a protector member encloses the diaphram to limit maximum expansion and prevent the diaphram from being damaged by sharp edges and corners in the reservoir.

The borehole fluid may enter through a passage in the cap at the top of the reservoir as shown in my U.S. Pat. No. 3,942,596. The fluid may also enter from the bottom of the bit adjacent the nozzle as shown in U.S. Pat. No. 3,476,195 issued to Galle. One advantage of the latter arrangement is that the borehole fluid and cuttings may drain out of the diaphram and passage by gravity when the bit is out of the borehole. Should it be desired to rerun the bit, it would not be necessary to disassemble and clean the pressure compensator assembly. A second advantage is the elimination of formation being scraped from the hole wall and forced through the passage in the top of the compensator cap when the drill stem is lifted. Formation entering the reservoir by this means depletes the grease supply in the lubrication reservoir by forcing this grease out the relief valve. With this arrangement, however, a seal is required at the interface of the diaphragm and the reservoir, and another seal is required adjacent the cap at the top of the lubricant reservoir. In the former arrangement, seal means are only required at the top of the reservoir since the base of the reservoir is not in communication with borehole fluids.

In order to avoid leakage, an improved sealing arrangement is desirable for the type of compensator that receives borehole fluid from its base. Moreover, as shown in the Galle patent, supra, if the diaphragm is sealed at the base, the cap at the top is normally retained solely by a retaining ring. Because of vibrations, retaining rings and caps at times dislodge, making improvements in the means for retaining the caps desirable.

SUMMARY OF THE INVENTION

The pressure compensator system in accordance with this invention utilizes a diaphram that has a lip projecting outwardly from the walls of the diaphram. The lip is placed against the base of the reservoir, communicating the exterior side of the diaphram with borehole fluid. The protector member fits over the diaphram, with the lower edge of the protector bearing downwardly against the lip. The cap is secured at the top of the reservoir and bears downwardly against the top of the protector member. The cap is held tightly by a retaining ring that is secured at a distance selected so that the lip of the diaphram is under compression. The compressed lip consequently serves as the primary seal against borehole fluids at the base. The compression of the lip further causes the cap to exert a positive pressure against the retaining ring, avoiding dislodgment caused by vibration in an abrasive fluid environment. A protective centering disc is attached to the center of the diaphram.

BRIEF DESCRIPTION OF THE DRAWINGS

FIG. 2 is an enlarged fragmentary longitudinal cross-sectional view of the pressure compensator system of FIG. 1.

FIG. 3 is a perspective view of the cap and protector of the lubricant pressure compensator system of FIG. 1, shown removed from the drill bit.

FIG. 4 is an enlarged top view of the compensator cap of the pressure compensator system of FIG. 1.

FIG. 5 is an enlarged partial cross-sectional view of the pressure compensator as shown in FIG. 2 with the lip of the diaphragm not under compression.

DESCRIPTION OF THE PREFERRED EMBODIMENT

Figure 1:
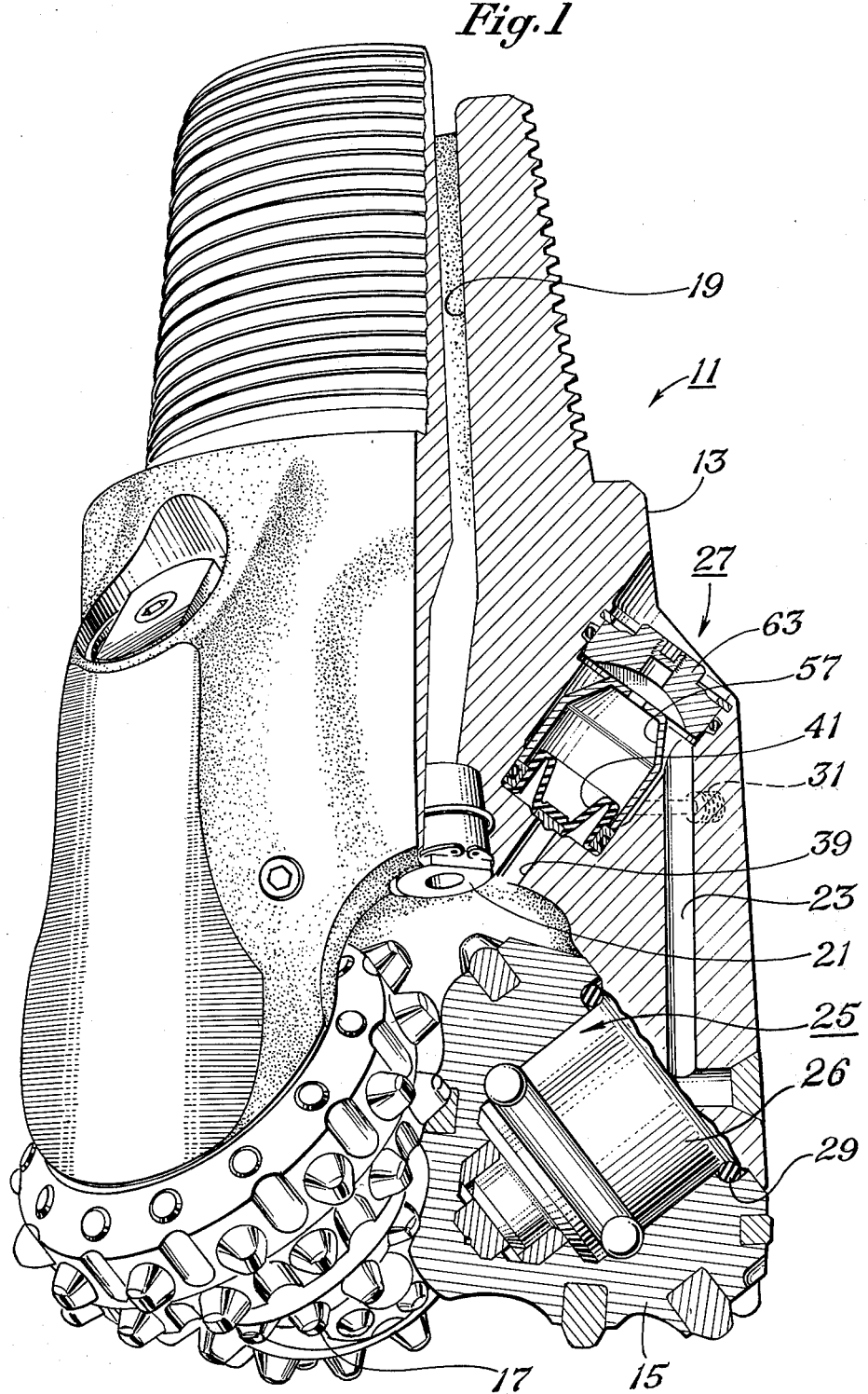
FIG. 1 is a perspective view, partially in section, of an earth boring drill bit having the improved pressure compensator system of the present invention.

The numeral 11 in FIG. 1 of the drawings designates a lubricated, rotatable cutter-type earth boring drill bit having a body 13 formed in three sections, known as head sections, that each support a rotatable cutter 15 having earth disintegrating teeth 17. The drill bit has an axial fluid passage 19 extending through the body with an exit at the body's lower end for the discharge of drilling fluid. The area on the lower end on the underside of the bit between the head sections is known as the shroud. Normally a nozzle 21 is located at the exit. Passages 23 supply lubricant to the bearing means 25 between the cutter 15 and supporting shaft 26. A pressure compensator system 27 helps provide lubricant through passages 23 to the bearing means 25, and limits the pressure differential across seal 29. A pressure relief valve indicated in phantom at 31 is in communication with the pressure compensator system 27 and passages 23 to limit the maximum pressure within the lubrication system.

Referring to FIG. 2, the pressure compensator system 27 is located in a lubricant reservoir or recess 33. Lubricant reservoir 33 has a base 35 and walls 37 that are substantially cylindrical. Base 35 is the lower extremity of the lubricant reservoir 33 as shown in the drawing and is in communication with a passage 39 that extends out of the bottom of the bit body 13 adjacent nozzle 21. Passage 39 provides means for the borehole fluid to enter the lubricant reservoir 33. Lubricant reservoir 33 is in communication with lubricant passages 23.

A flexible diaphragm 41, normally of oil resistant rubber or nitrile rubber compound, is inserted in the lubricant reservoir 33, separating the lubricant from the borehole fluid which enters passage 39. The diaphragm 41 is generally cup-shaped with its upper portion flexible so that the closed upper end will move longitudinally within the lubricant reservoir 33 responsive to pressure changes. The mouth of the diaphram 41 faces passage 39, with one side, termed the exterior side in contact with borehole fluid entering from the exterior. The opposite or interior side is in contact with lubricant. Primary seal means or lip 43 projects outwardly from the diaphram walls 45 and seats against base 35 at the intersection with walls 37. The outer diameter of lip 43 is substantially equal to the reservoir 33 diameter at the base 35. The lower edge 47 of the lip is arcuate, as shown in FIG. 5, which shows the lip 43 while not under compression. The upper edge 49 of the lip is flat.

A metal disc 51 is bonded to the exterior side of the diaphram at its closed end to strengthen the closed end and prevent damage to the diaphram when it is pressed against the upper end of passage 39 when lubricant pressure is higher than external pressure. The centering button or 90° point 81 assures the metal disc will be centered over the passage 39.

Secondary seal means comprising a ring 53 and O-ring seal 55 is assembled over the walls of the diaphragm 41, the lower edge of the ring 53 bearing downwardly against the upper edge 49 of the lip. O-ring 55 located in a suitable O-ring groove formed in ring 53, sealingly engages the cylindrical walls 37 of the reservoir, providing a secondary seal against borehole fluids from entering the lubricant portion of the reservoir 33. Preferably the ring 53 is metal and is bonded to the diaphram 41.

A protector means or member 57, shown disassembled in FIG. 3, encloses the diaphram 41 to limit expansion. The protector member 57 is generally cup-shaped with its open end or mouth bearing downwardly against ring 53. Thus ring 53 also serves to transmit the compresive force of lip 43 to the protector member 57. The closed end 59 of the protector member is less in diameter than its open end and contains an aperture 61. The protector member 57 is preferably metal with its interior being smooth so as to prevent damage to the diaphram 41 when the diaphram is at maximum expansion. The thick rubber section 78 of the diaphram, reinforced by the center metal disc 51, prevents aperture 61 from damaging the diaphram 41 when the external pressure is much higher than the lubricant pressure.

A cap 63 is secured in the top of reservoir 33. The interface between the reservoir wall 37 and the cap 63 is sealed from borehole fluids by an O-ring 65 located in a groove within the reservoir walls 37. Cap 63 bears downwardly against the closed end 59 of protector member 57. Referring to FIG. 3, the lower surface 69 of cap 63 contains channel means or a channel 71 for allowing the passage of lubricant out through aperture 61. Channel 71 extends transversely to the axis of the cap, its length being greater than the diameter of the closed end of protector member 57. Lubricant may pass through the aperture 61, channel 71 and along the tapered portions of the protector member 57. Cap 63 also has an axial passage 73 extending through the cap in alignment with aperture 61 and channel 71. Seal means or threaded plug 75 seals the passage 73 from borehole fluids. Axial passage 73 is used for filling the bit with lubricant, as will be described hereinafter.

Cap 63 is retained within reservoir 33 by retaining means comprising a retaining ring 77 located within a groove spaced upwardly from the cap. Retaining ring 77 is located at a selected distance so that during assembly, the cap 63 must be forcibly pressed into the reservoir 33, axially or downwardly compressing the arcuate portion of diaphram lip 43, as shown in FIG. 2. Preferably the lip 43 must be compressed within the range of 0.016 inch to 0.064 inch on flexible diaphram 41 with lip diameter above 1⅜ inch and 0.006 inch to 0.050 inch on flexible diaphram 41 with lip diameter of 1⅜ inch or smaller. Shoulder 79 is located in the reservoir walls 37 just below cap 63. This shoulder provides a stop for the cap in the event the cap is struck by an unusual force such as a projection in the hole wall while the bit is being pulled from the hole.

In operation, the bit is assembled prior to lubrication with the pressure compensator in place and cap 63 pressed tightly against the protector member 57 and secured by its retaining ring 77. Threaded plug 75 is removed from the cap, then all air is withdrawn from the lubrication system and bearings through passage 73 and a vacuum check is made for leaks in the system. While a vacuum is maintained on the lubrication system an external two-way valve (not shown) allows the lubricant to be introduced into the lubrication system under pressure. When full, the lubricant pressure actuates the pressure relief valve 31, discharging lubricant. Threaded plug 75 is replaced after greasing with the aid of wrench flats 80, thereby sealing the system. This air evacuation and pressure grease method provides a vacuum check for leaks of the complete lubrication system and bearing seal, and tests the operation of the pressure relief valve.

The lubricant pressure will force the diaphram to its position as shown in the drawings with the closed end being in contact with the base, blocking passage 39. As the bit is lowered into the well, hydrostatic pressure of the borehole fluid forces the fluid up passage 39 against the exterior side of diaphram 41. As the hydrostatic pressure increases, the end of diaphram 41 moves upwardly, decreasing the volume that the lubricant is within, thereby increasing the lubricant pressure until it substantially equals the borehole pressure. When equal, there will be no pressure differential across seal 29 on the cutter 15.

It is accordingly seen that an invention having significant improvements has been provided. The arcuate lip of the diaphram provides a tight seal against borehole fluids since it is held in compression. The compression also exerts a force on the retainer ring, preventing the cap from being lost because of vibration aided by the erosive action of abrasive drilling fluids.

The foregoing disclosure and the showings made in the drawings are merely illustrative of the principles of this invention and are not to be interpreted in a limiting sense.

I claim:
1. In an earth boring drill bit of the type having rotatable cutters mounted on depending head sections that define a shroud on the underside of the bit between the head sections, lubricant passages for supplying lubricant to the cutters, a lubricant reservoir having a base and walls, and a passage for the admission of borehole fluids extending from the base of the lubricant reservoir to the shroud, an improved lubricant compensator for equalizing the lubricant pressure with the borehole pressure comprising:
   a flexible diaphram located in the reservoir, being expansible to define a cup-shaped configuration with a closed end, one side of the diaphram being in contact with the borehole fluid, the other side of the diaphram being in contact with lubricant in the reservoir;

primary seal means seated at the base of the reservoir for preventing borehole fluid from entering the lubricant reservoir;

protector means enclosing the diaphram for limiting expansion of the diaphram, with a mouth facing the primary seal means;

a closed cap bearing against the end of the protector means that is opposite the mouth and sealing the top of the reservoir from borehole fluids; and retaining means for securing the cap and compressing the primary seal means, thereby providing a seal from borehole fluids at the interface of the primary seal means and the base.

2. In an earth boring drill bit of the type having rotatable cutters mounted on depending head sections that define a shroud on the underside of the bit between the head sections, lubricant passages for supplying lubricant to the cutters, a lubricant reservoir having a base and walls, and a passage for the admission of borehole fluids extending from the base of the lubricant reservoir to the shroud, an improved lubricant compensator for equalizing the lubricant pressure with the borehole pressure comprising:

a flexible diaphram located in the reservoir, having a closed end and a mouth that faces the base of the reservoir, placing the exterior side of the diaphram in contact with borehole fluid, the interior side of the diaphram being in contact with lubricant in the reservoir;

a lip, defining the outer periphery of the mouth, and protruding outward from the walls of the diaphram, its lower edge seated against the base of the reservoir for providing a primary seal means against borehole fluids;

protector means for limiting expansion of the diaphram, the lower end of the protector means facing the upper edge of the lip of the diaphram;

means at the lower end of the protector means, for transmitting the compressive force of the lip to the protector means;

resilient secondary seal means, between the wall of the reservoir and the protector means, for providing a secondary seal against borehole fluids;

a closed cap bearing against the upper end of the protector means and sealingly secured within the reservoir to prevent borehole fluids from entering; and retaining means for securing the cap and axially compressing the lip of the diaphram, thereby retaining the cap tightly against the retaining means and providing a seal from borehole fluids at the interface of the lip and the base.

3. The lubricant compensator according to claim 2 wherein the means for transmitting the compressive force of the lip to the protector means comprises:

a metal ring having an annular groove containing said secondary seal means in the form of an O-ring seal, interposed between the protector means and the upper edge of the lip.

4. In an earth boring drill bit of the type having rotatable cutters, a drilling fluid passage for the discharge of drilling fluid, lubricant passages for supplying lubricant to the cutters, a lubricant reservoir having a base and walls, and a passage for the admission of borehole fluid extending from the base of the lubricant reservoir to a point adjacent the exit of the drilling fluid passage, an improved lubricant compensator for equalizing the lubricant pressure with the borehole pressure comprising:

a flexible diaphram located in the reservoir having a mouth that faces the base of the reservoir, placing the exterior side of the diaphram in contact with borehole fluid, the interior side of the diaphram being in contact with lubricant in the reservoir;

a lip, defining the outer periphery of the mouth, its lower edge seated against the base of the reservoir;

a generally cup-shaped protector member for limiting expansion of the diaphram and having an open end bearing downwardly against the upper edge of the lip of the diaphram, the opposite end of the protector member being closed except for an aperture for the passage of lubricant;

a cap sealingly secured within the reservoir and bearing against the closed end of the protector member;

channel means within the cap, in communication with the aperture in the protector member, for allowing the passage of lubricant between the lubricant reservoir and the lubricant passages; and retaining means for securing the cap in place while the lip of the diaphram is under compression, thereby retaining the cap tightly against the retaining means and providing a seal from borehole fluids at the interface of the lip and the base.

5. The pressure compensator according to claim 4 wherein the channel means comprises a transverse channel on the lower side of the cap in communication with the aperture in the protector member, the closed end of the protector member being smaller in diameter than the length of the channel so as to allow the passage of fluid along the channel and through the aperture.

6. In an earth boring drill bit of the type having rotatable cutters, a drilling fluid passage for the discharge of drilling fluid, lubricant passages for supplying lubricant to the cutters, a lubricant reservoir having a base and walls, and a passage for the admission of borehole fluid extending from the base of the lubricant reservoir to a point adjacent the exit of the drilling fluid passage, an improved lubricant compensator for equalizing the lubricant pressure with the borehole pressure comprising:

a flexible diaphram located in the reservoir having a mouth that faces the base of the reservoir, placing the exterior side of the diaphram in contact with borehole fluid, the interior side of the diaphram being in contact with lubricant in the reservoir;

a lip, defining the outer periphery of the mouth, its lower edge seated against the base of the reservoir;

protector means for limiting expansion of the diaphram, the lower end of the protector means bearing downwardly against the upper edge of the lip of the diaphram;

a cap bearing against the upper end of the protector means, the cap having an axial passage therethrough for filling lubricant and means for sealing the passage in the cap when the lubricant passages are full; and retaining means for securing the cap in place while the lip of the diaphram is under compression, thereby retaining the cap tightly against the retaining means and providing a seal from borehole fluids at the interface of the lip and the base.

7. In an earth boring drill bit of the type having rotatable cutters, a fluid passage with a nozzle at its lower end for the discharge of drilling fluid, lubricant passages for supplying lubricant to the cutters, a lubricant reservoir having a base and walls, and a passage extending from the base of the lubricant reservoir to a point adjacent the nozzle for the admission of borehole fluid, an improved lubricant compensator for equalizing the lubricant pressure with the borehole pressure comprising:
- a flexible diaphram located in the reservoir having a mouth that faces the base of the reservoir, placing the exterior of the diaphram in contact with borehole fluid, the interior side of the diaphram being in contact with lubricant in the reservoir;
- a lip, defining the outer periphery of the mouth, its lower edge seated against the base of the reservoir;
- a generally cup-shaped protector member for limiting expansion of the diaphram and having an open end bearing downwardly against the upper edge of the lip of the diaphram, the upper end being closed except for an aperture for the passage of lubricant;
- seal means, between the wall of the reservoir and the protector means, for providing a secondary seal against borehole fluids;
- a cap sealingly secured within the reservoir and bearing against the closed end of the protector member;
- a transverse channel on the lower side of the cap in communication with the aperture in the protector member, the closed end of the protector member being smaller in diameter than the length of the channel so as to allow the passage of fluid along the channel and through the aperture;
- an axial passage extending through the cap for filling lubricant and means for sealing the passage in the cap when the lubricant passages are full;
- retaining means for securing the cap in place while the lip of the diaphram is under compression, thereby retaining the cap tightly against the retaining means and providing a seal from borehole fluids at the interface of the lip and the base.

8. The pressure compensator of claim 7 wherein the retaining means comprises a groove in the walls of the reservoir and a retaining ring retained within the groove.

9. The pressure compensator of claim 7 wherein the lower edge of the lip is arcuate and the upper edge is flat.

10. The apparatus according to claim 9 wherein the lip is compressed in the range from 0.006 inch to 0.064 inch.

* * * * *